US010666501B2

United States Patent
Cui et al.

(10) Patent No.: US 10,666,501 B2
(45) Date of Patent: May 26, 2020

(54) SOFTWARE DEFINED NETWORK BASED CPRI SWITCH FOR IMPROVED AVAILABILITY IN CLOUD-BASED RAN

(71) Applicants: AT&T Intellectual Property, I, L.P., Atlanta, GA (US); AT&T Mobility II, Atlanta, GA (US)

(72) Inventors: Zhi Cui, Sugar Hill, GA (US); Wenge Chen, Austin, TX (US)

(73) Assignees: AT&T Intellectual Property, I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 105 days.

(21) Appl. No.: 15/267,086

(22) Filed: Sep. 15, 2016

(65) Prior Publication Data
US 2018/0077006 A1    Mar. 15, 2018

(51) Int. Cl.
| | |
|---|---|
| *H04L 12/24* | (2006.01) |
| *H04L 12/751* | (2013.01) |
| *H04L 12/715* | (2013.01) |
| *H04W 24/02* | (2009.01) |
| *H04L 12/703* | (2013.01) |
| *H04L 12/741* | (2013.01) |
| *H04W 88/08* | (2009.01) |

(52) U.S. Cl.
CPC ...... *H04L 41/0668* (2013.01); *H04L 41/0816* (2013.01); *H04L 41/12* (2013.01); *H04L 45/02* (2013.01); *H04L 45/64* (2013.01); *H04W 24/02* (2013.01); *H04L 45/28* (2013.01); *H04L 45/54* (2013.01); *H04W 88/085* (2013.01)

(58) Field of Classification Search
CPC ... H04W 88/085; H04W 24/02; H04W 88/08; H04W 24/08; H04W 28/08
See application file for complete search history.

(56) References Cited

U.S. PATENT DOCUMENTS

| | | |
|---|---|---|
| 8,937,904 B2 | 1/2015 | Machida |
| 9,112,758 B2 | 8/2015 | Niu et al. |
| 9,125,047 B2 | 9/2015 | Sundaresan et al. |
| 9,258,629 B2 | 2/2016 | Graves et al. |
| 2014/0226736 A1* | 8/2014 | Niu ............... H04L 27/2628 375/260 |
| 2015/0215044 A1 | 7/2015 | Cvijetic et al. |
| 2015/0286633 A1 | 10/2015 | Dubal et al. |
| 2015/0288445 A1* | 10/2015 | Lins de Medeiros ............ H04L 41/0681 398/20 |
| 2015/0295699 A1 | 10/2015 | Joung et al. |

(Continued)

OTHER PUBLICATIONS

"The Benefits of Cloud-RAN Architecture in Mobile Network Expansion"; Fujitsu Network Communications Inc.; © 2014; 8 pages.

(Continued)

*Primary Examiner* — Jung H Park
(74) *Attorney, Agent, or Firm* — BakerHostetler (57) ABSTRACT

A system includes a software defined Common Public Radio Interface (CPRI) switch, a plurality of eNobeBs connected to the CPRI switch using CPRI protocol, a plurality of Baseband units (BBUs) connected to the CPRI switch using CPRI protocol and wherein the CPRI switch is configured to connect a first one of the plurality of BBUs to a first one of the plurality of eNobeBs.

13 Claims, 6 Drawing Sheets (56) References Cited

U.S. PATENT DOCUMENTS

| | | | |
|---|---|---|---|
| 2016/0029205 A1* | 1/2016 | Sirotkin | H04W 24/02 |
| | | | 455/418 |
| 2016/0073278 A1 | 3/2016 | Roessler et al. | |
| 2016/0081046 A1 | 3/2016 | Li et al. | |
| 2016/0088483 A1 | 3/2016 | Kao et al. | |
| 2016/0119087 A1 | 4/2016 | Rost et al. | |
| 2016/0119932 A1 | 4/2016 | Cui et al. | |
| 2016/0316463 A1* | 10/2016 | Liu | H04W 72/044 |
| 2017/0222880 A1* | 8/2017 | Callard | H04L 41/12 |
| 2017/0374625 A1* | 12/2017 | Abdelmonem | H04L 5/0073 |

OTHER PUBLICATIONS

Arslan et al.; "Software-Defined Networking in Cellular Radio Access Networks: Potential and Challenges"; IEEE Communications Magazine; Jan. 2015; p. 150-156.

Cvijetic; "Optical Network Evolution for 5G Mobile Applications and SDN-based Control"; IEEE 16$^{th}$ Int'l Telecommunications Network Strategy and Planning Symposium; 2014; 5 pages.

* cited by examiner

SOFTWARE DEFINED NETWORK BASED CPRI SWITCH FOR IMPROVED AVAILABILITY IN CLOUD-BASED RAN

TECHNICAL FIELD

Embodiments of the present inventions relate to methods and systems for implementing a CPRI switch in a cellular network, and more particularly to methods and systems that uses software defined machine concepts within the CPRI switch.

BACKGROUND

A typical wireless base station, which may, for example be a Long Term Evolution (LTE) eNodeB (eNB) consists of the baseband processing unit (BBU) and the RF processing unit, also known as the remote radio unit (RRU). The BBU is typically placed in the equipment room and connected with the RRU via optical fiber using the common public radio interface (CPRI). A single BBU can support multiple RRUs. The determination of which RRU connects to which BBU pool currently is through OSS and/or manual configurations that are not dynamic. In case of a BBU or CPRI link failure, a number of cell sites that hosted corresponding RRUs will be out of service. Customers within the coverage area of the affected RRUs will have their service impacted. In such a case, alarms may be generated and sent to the OSS or network operation center. Technicians may be called to manually switch the CPRI connection to a working BBU.

While some redundancy is possible, for example, deploying redundant CPRI routes to a primary and a secondary, it is a very expensive solution. Thus, there is a need for an automatic dynamic failure recovery solution.

SUMMARY

In an embodiment, a system includes a software defined Common Public Radio Interface (CPRI) switch, a plurality of eNobeBs connected to the CPRI switch, and a plurality of baseband units (BBUs) connected to the CPRI switch, wherein the CPRI switch is configured to connect a first one of the plurality of BBUs to a first one of the plurality of eNobeBs. In an aspect, the CPRI switch is configured to detect an event relating to the first one of the plurality of BBUs and in response to detecting the event, the CPRI switch is further configured to dynamically re-configure forwarding tables to connect a second one of the plurality of BBUs to the first one of the plurality of eNodeBs. The event may be a fault or an external event, which may, for example, be one of a new site build, a cell site split, and an optimization of a cell site. In an aspect, the reconfiguration is performed by a software-defined controller within the CPRI switch and the event is detected by the controller and wherein the controller is configured to execute an algorithm to update the forwarding tables upon the detection of the event. In an aspect, the CPRI switch is further configured to connect the first one of the plurality of BBUs to a second one of the plurality of eNodeBs when the first one of the plurality of eNodeBs is unavailable.

The disclosure also includes a method, including connecting a plurality of BBUs and eNodeBs to a software defined CPRI switch, wherein the control plane and the forwarding plane are separated in the CPRI switch, generating forwarding tables to map BBUs to eNodeBs; detecting an event, and updating the forwarding tables responsive to the detecting step. The event may be a default or an external event, which may, for example, include one of a new site build, a cell site split, and an optimization of a cell site The disclosure also includes a CPRI switch including an input/output system for communicatively coupling BBUs to eNodeBs through the CPRI, a processor communicatively coupled to the input and output system, and memory storing instructions that cause the processor to effectuate operations, the operations including generating forwarding tables to map BBUs to eNodeBs, detecting an event, and updating the forwarding tables responsive to the detecting step. The event may be a fault or an external event, which may, for example, may be one of a new site build, a cell site split, and an optimization of a cell site.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Overview. The present disclosure may assist mobile operators in deploying cloud-based radio access networks (cloud-base RAN or CRAN) by increasing the overall reliability and availability of the CRAN. Moreover, the present disclosure assists in reconfiguring the Coordinated Multiple Point (CoMP) LTE-A feature group for coordination optimization for a new site build, site split, small cell densification or cell sites RF optimization.

Figure 1:
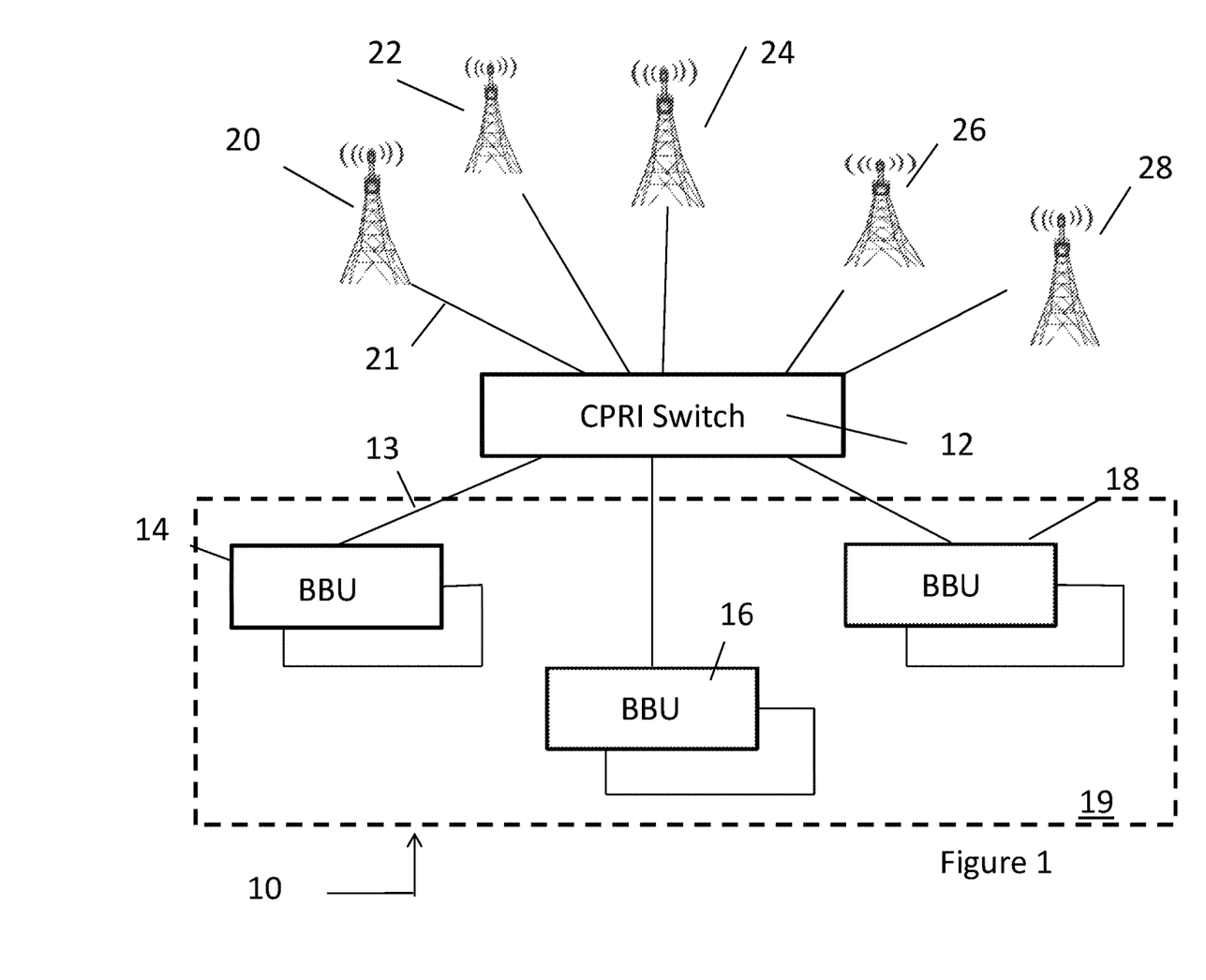
FIG. 1 is a schematic representation of an exemplary system environment in which the methods and systems to dynamically manage remote radio units may be implemented.

System Environment. Illustrated in FIG. 1 is a schematic representation of an exemplary system environment 10 in which embodiments of the present disclosure may operate. There is shown BBUs 14, 16, 18 within a BBU cluster 19. Within each BBU 14, 16, 18, there is shown an exemplary shadow BBU 14a, 16a, 18a. which may, for example be representative of one or more back-up BBUs. The BBU cluster 19 may also serve as a cloud-based radio access network (CRAN) which may, for example dynamically allocated BBU resources to adapt to increase capacity during peak usage or in capacity expansion.

There is also shown a CPRI switch 12. The CPRI switch 12 interconnects individual BBUs 14, 16, 18 to eNBs 20, 22, 24, 26, 28. Those skilled in the art will understand that a single BBU 14, 16, 18 may support multiple eNBs 20, 22, 24, 26, 28. As such, the ratio of BBUs to eNBs illustrated in FIG. 1 is for exemplary purposes only and is not meant to limit the disclosure in any manner. For exemplary purposes, also shown in FIG. 1 is CPRI link 13 connecting BBU 14 to CPRI switch 12.

Figure 2:
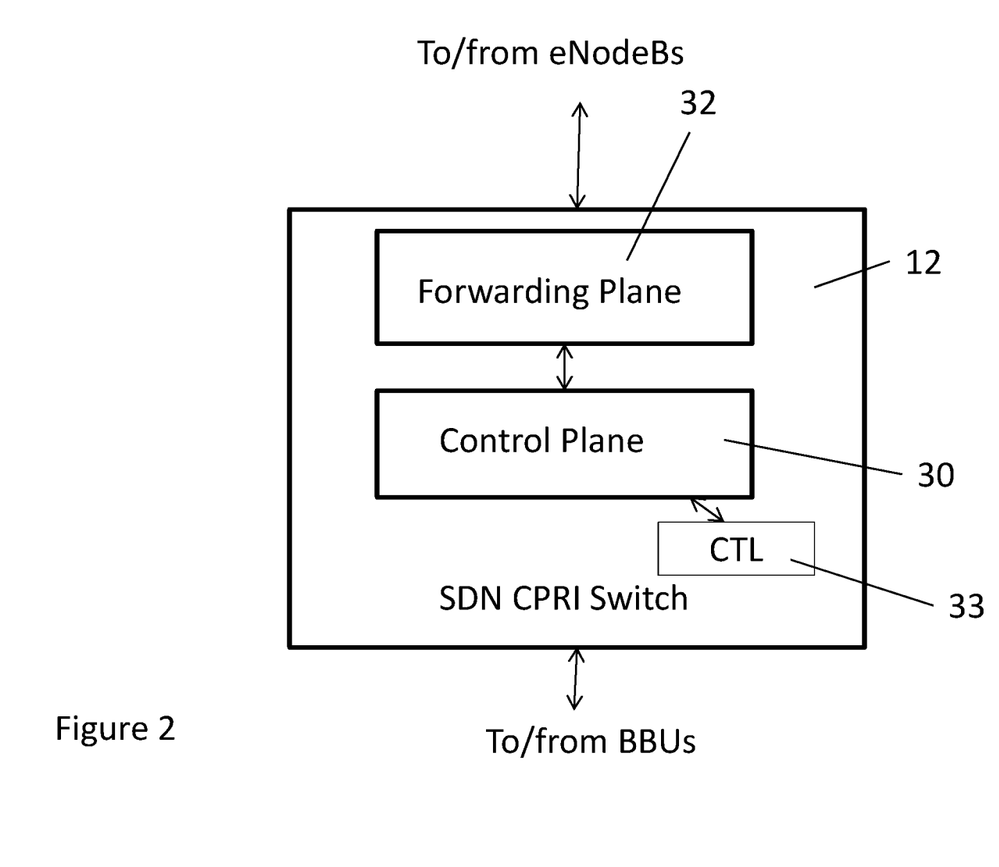
FIG. 2 is a system diagram of an exemplary SDN-based CPRI switch.

CPRI Switch. FIG. 2 is an exemplary block diagram illustrating the functionality of a CPRI switch 12. The present disclosure expands the concept of software defined network principles to a CPRI switch 12. The CPRI switch 12 facilitates a one-to-one connection between a BBU 14, 16, 18 to an eNB 20, 22, 24, 26, 28 or a one-to-a-plurality connection between one of a BBU 14, 16, 18 to multiple eNBs 20, 22, 24, 26, 28.

As shown in FIG. 2, the functionality of the CPRI switch 12 may be divided into a control plane 30 and a forwarding plane 32. The control plane 30 includes functionality to construct the signaling messages that are exchanged between one of the eNBs 20, 22, 24, 26, 28 and a mobile device (not shown) using a radio resource control (RRC) protocol. Typical control plane functions may include systems configuration, management, creating, maintaining, and exchanging of routing table information. The control plane 30 is managed by a software-based controller 33 which effects the operations of the CPRI switch 12.

The control plane 30 feeds information to the forwarding plane 32 to create forwarding tables for routing of data. Although only one forwarding plane 32 is shown, there may be multiple forwarding planes operating in a distributed environment to achieve higher performance.

Using SDN concepts for the CPRI switch 12 permits the rapid configuration and reconfiguration of the CPRI switch 12. Separating out the control plane 30 permits the aggregation of the multitude of the control plane functions in the software-based controller 33. This permits the control plane 30 to maintain a complete view of the network topology while providing application programming interfaces (APIs) to operators. The SDN controller 33 may be responsible for configuring the forwarding plane 32 of the CPRI switch, which may, for example, map the line side of the CPRI port associated with an eNodeB to the trunk side CPRI port that is corresponding to a BBU cluster 19. Moreover, with the use of cloud-based RANs, separation of the forwarding plane 32 permits the processing functions to be decoupled from the transmission functions.

The CPRI switch 12 in the configuration of system 10 routes data between BBUs 14, 16, 18 and eNodeBs 20, 22, 24, 26, 28 by connections through a software switch, for example connecting BBU 14 to each of eNodeBs 20, 22, and 24. In such a connection, the control plane 30 of the CPRI switch 12 may configure the connection by creating routing tables for the transfer of data between, for example, the eNodeBs 20, 22 and 24 and BBU 14. The forwarding plane 32 receives those routing tables and uses them in transferring data to and from the eNodeBs 20, 22 and 24 and BBU 14. During "normal operations", the CPRI switch 12 may monitor traffic and reconfigure the connections for efficient use of system resources.

Figure 3:
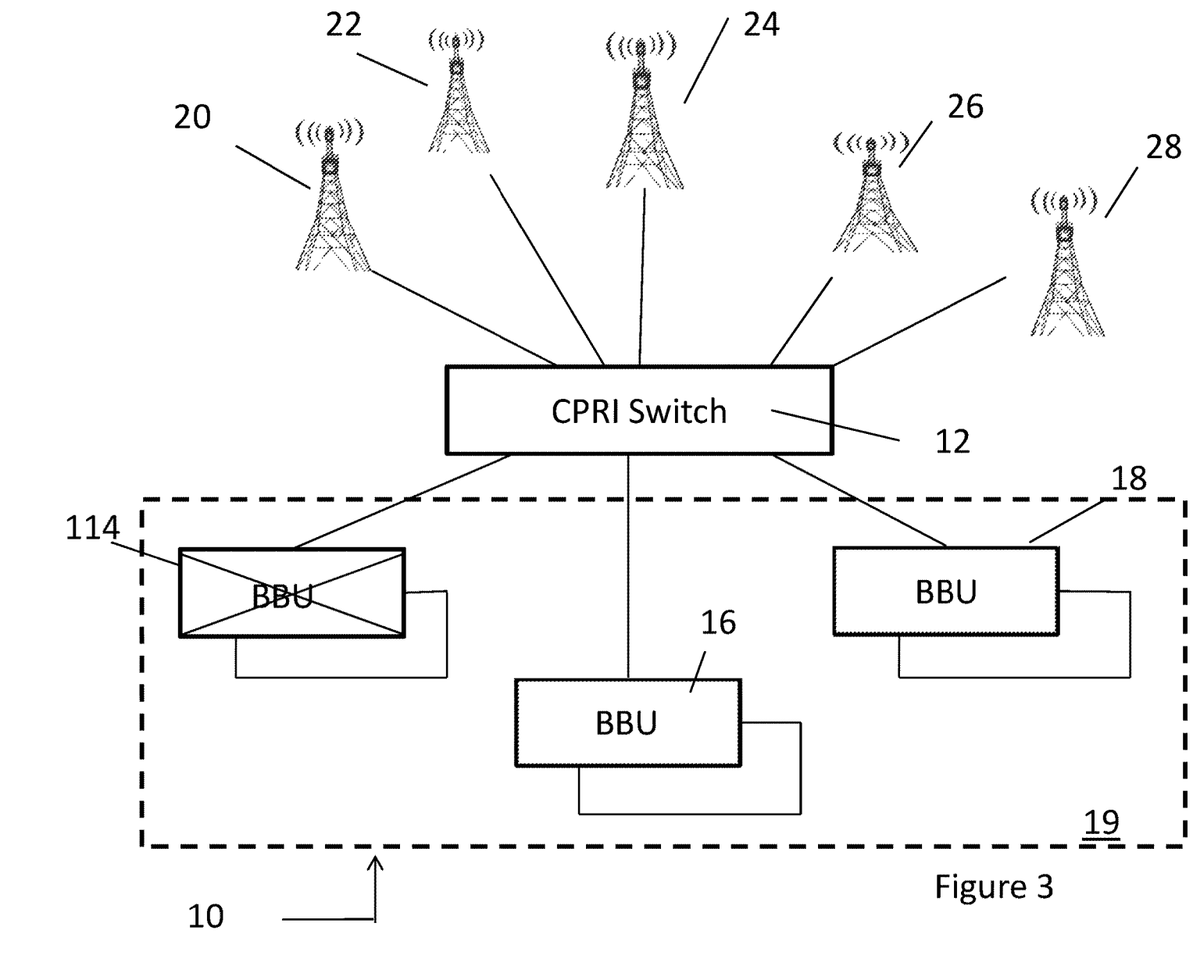
FIG. 3 is a schematic representation of the exemplary embodiment of FIG. 1 showing a failure of a BBU.

Reconfiguration examples using CPRI Switch. Illustrated in FIG. 3 is an exemplary embodiment of the system 10 in which the BBU 114 has been taken off-line either by failure or because BBU 14 is going into a maintenance mode. When BBU 114 goes off-line, that event is detected by CPRI switch 12. Based on the relative traffic among other BBUs 16, 18, the time of day, maintenance schedules and other load or environmental factors, the CPRI switch 12 may reconfigure the control plane tables to establish connections between the remaining BBUs 16, 18 and the eNodeBs 20, 22 24 which had previously been connected to BBU 114. In such reconfiguration, the control plane 30 within the CPRI switch 12 will reconfigure the control plane tables and pass those tables to the forwarding plane 32 for transmission in accordance with the new configuration.

Figure 4:
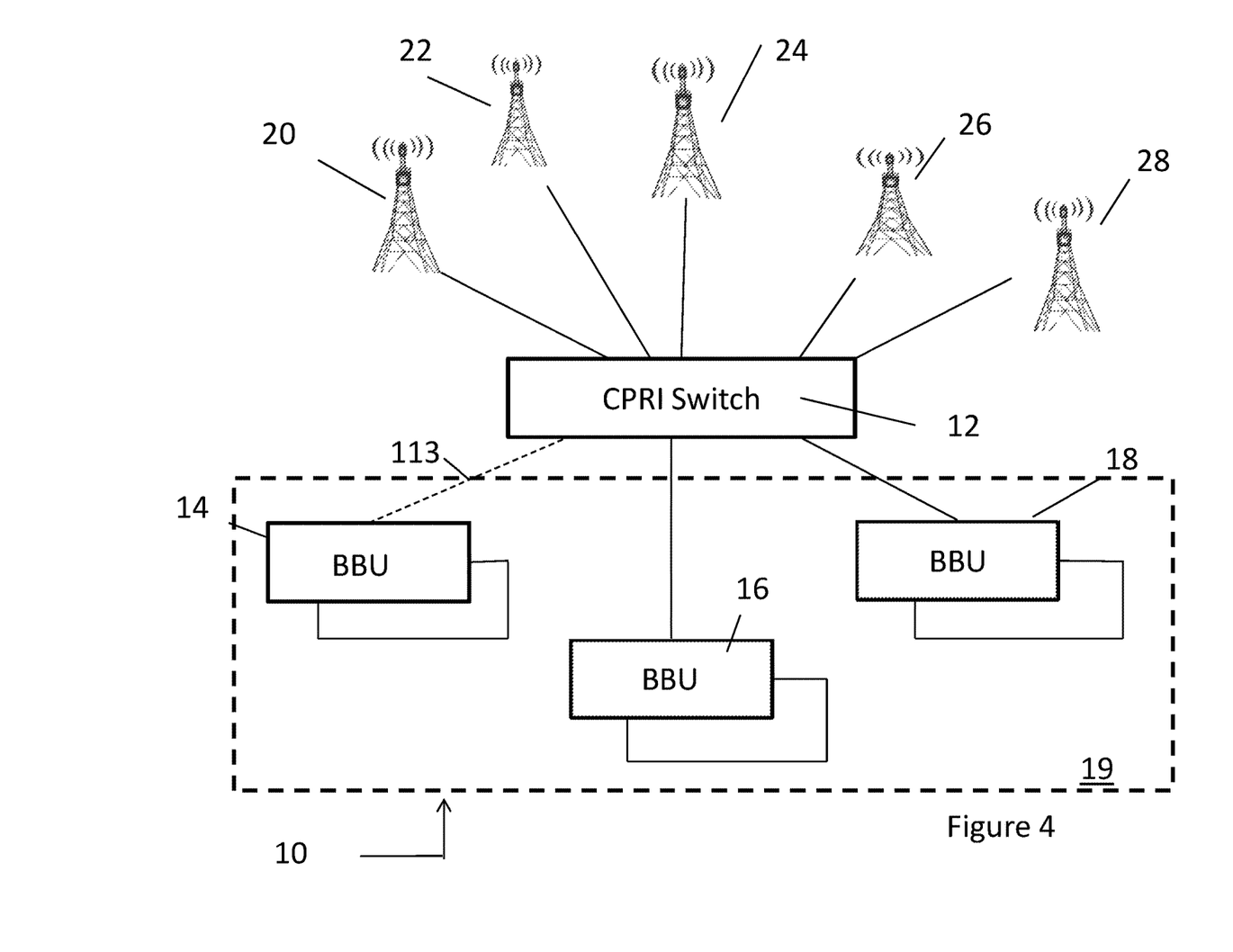
FIG. 4 is a schematic representation of the exemplary embodiment of FIG. 1 showing a failure of the link between a BBU and the CPRI switch.
Figure 5:
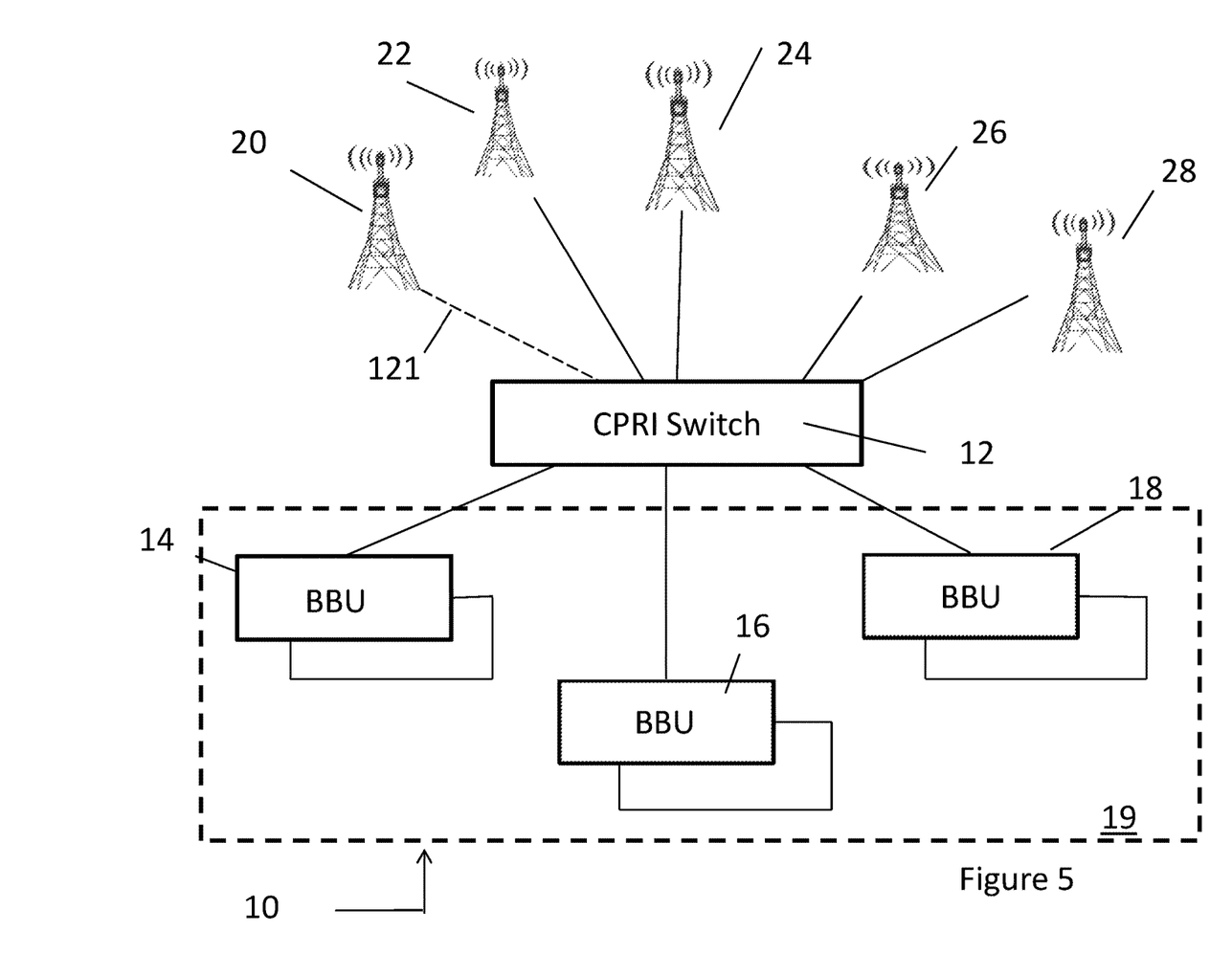
FIG. 5 is a schematic representation of the exemplary embodiment of FIG. 1 showing a failure of the link between a CPRI switch and an eNodeB.

Illustrated in FIG. 4 is an exemplary embodiment of the system 10 in which the BBU 14 has been taken off-line by a failure of CPRI link 113. When CPRI link 113 fails, CPRI switch 12 detects that failure and those eNodeBs previously connected to BBU 14 will be reassigned to the other BBUs 16 18 based on the relative traffic among other BBUs 16, 18, the time of day, maintenance schedules and other performance or environmental factors. The CPRI switch 12 will reconfigure the control plane tables to establish connections between the remaining BBUs 16, 18 and the eNodeBs which had previously been connected to BBU 14. In such reconfiguration, the control plane 30 of CPRI switch 12 will reconfigure the control plane tables and pass those tables to the forwarding plane 32 for transmission in accordance with the new configuration Illustrated in FIG. 5 is an exemplary embodiment of the system 10 in which eNodeB 20 has been taken off-line either by failure or because eNodeB 20 is going into a maintenance mode. When eNodeB 20 goes off-line, that event is detected by CPRI switch 12. Based on the relative traffic among other eNodeBs 22, 24, 26, 28, the geographic considerations, the time of day, maintenance schedules and other performance or environmental factors, the control plane 30 of CPRI switch 12 will reconfigure the control plane tables to establish connections between the BBUs 14, 16, 18 and the remaining eNodeBs 22, 24, 26, 28 to be used by the forwarding plane 32.

Figure 6:
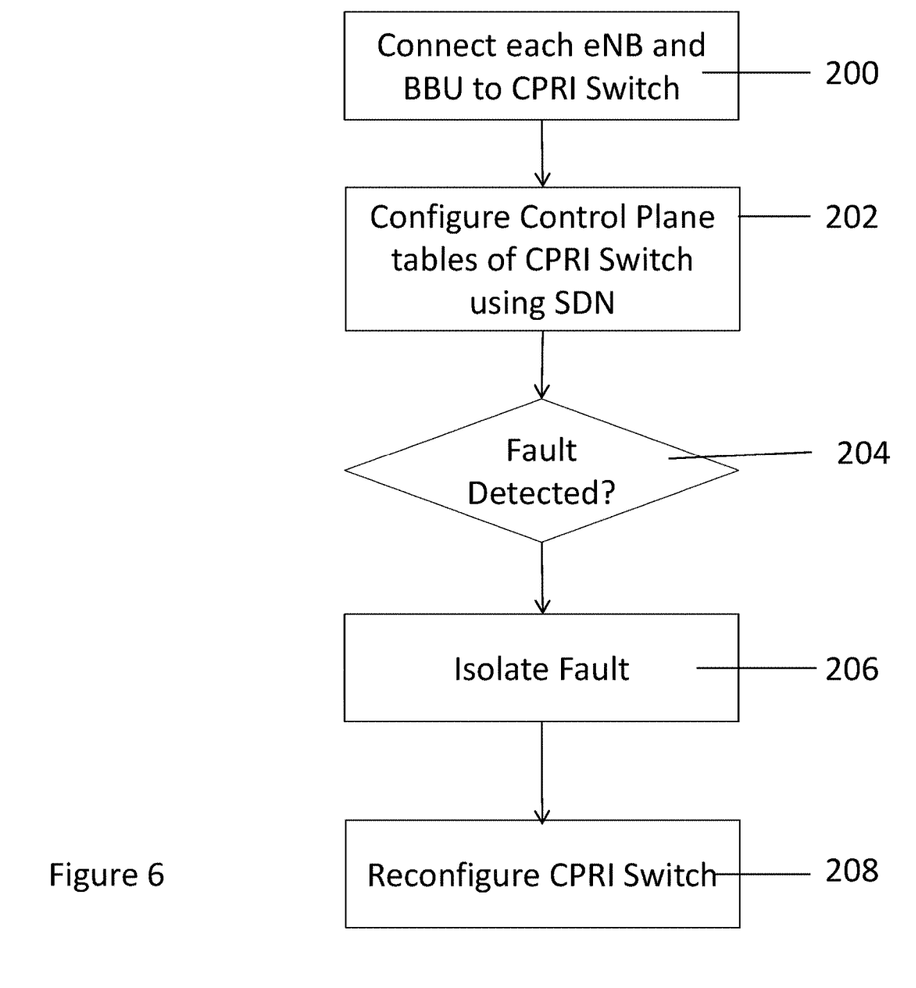
FIG. 6 is a flow diagram of an exemplary embodiment of a method for operating a SDN-based CPRI switch in a network environment.

With reference to FIG. 6, there is shown an exemplary process flow for the reconfiguration of the system 10. By way of example, at 200 each RRU is connected to CPRI switch using one or more ports. At 202, the control plane tables of the CPRI switch 12 are configured to provide the network topology of the connections between the BBUs 14, 16, 18 to the eNodeBs 20, 22, 24, 26, 28. The Coordinated Multiple Point (CoMP) a feature of LTE-A, group configuration, namely the membership of each of the eNodeBs in the CoMP group, or the mapping of each RRU to a BBU is based on an algorithm that is resident in the SDN controller 33. In normal operations, the configuration may remain that way for a period of time or based on a schedule as set by an operator. At step 204, the decision is made whether a fault has been detected. Faults may include, for example the failure of a CPRI link, for example, CPRI link 113 or a BBU, for example BBU 114, and may be detected by means of CPRI 8B/10B code violations, sync header violations, or a lost connection to a given BBU card/port from the BBU cluster 19 or from the SDN controller 33 that controls the BBU 14, 16, 18. If no fault is detected, or alternatively, if no external input is detected, the configuration continues at 205. If a fault is detected, then the fault is isolated at 206. The controller 33 then changes the inputs to the algorithm, such as, for example, the detected fault, to trigger the algorithm to rerun and may cause an eNodeB to BBU mapping on CPRI switch 12. It should be noted that such reconfiguration is not limited to a detection of faults by SDN controller 33, but external events such as a new site build, cell site split or RF optimization of a cell site may also trigger the algorithm to rerun and may cause an RRU to BBU remapping on CPRI switch 12 to realize the new CoMP group configuration to achieve the best coordination gain of the cloud-based RAN. At 208, the SDN controller 33 dynamically re-configures the CPRI switch forwarding table as described above from the failed BBU to a working BBU based on the load condition of the remaining BBUs and each RRU impacted. As a result the RRUs are re-routed to a working BBU dynamically such that the availability is much improved.

As set forth herein, this disclosure applies SDN principles to provide a SDN based CPRI switch 12 for dynamic recovery of a BBU failure or a CPRI link failure between a BBU and eNodeB, or in the case of the need to reconfigure the CoMP group. This allows improved cloud-based RAN availability, improved network performance and capacity, and improved end user experience while reducing operation cost.

Although not every conceivable combination of components and methodologies for the purposes describing the present disclosure have been set out above, the examples provided will be sufficient to enable one of ordinary skill in the art to recognize the many combinations and permutations possible in respect of the present disclosure. Accordingly, this disclosure is intended to embrace all such alterations, modifications and variations that fall within the spirit and scope of the appended claims. For example, numerous methodologies for defining dynamic reconfiguration of software-based CPRI switch 12 may be encompassed within the concepts of the present disclosure.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

While example embodiments of a reconfigurable SDN CPRI switch 12 have been described in connection with various computing devices/processors, the underlying concepts can be applied to any computing device, processor, or system capable of receiving visual voice mail notifications as described herein. The methods and apparatuses for dynamically reconfiguring a CPRI switch 12, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for distributing connectivity and/or transmission time. A computer-readable storage medium, as described herein is an article of manufacture, and thus, is not to be construed as a transitory signal. In the case of program code execution on programmable computers, which may, for example, include controller 33, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems of the present disclosure may be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, a controller, or the like, the machine becomes an apparatus for use in reconfiguration of systems constructed in accordance with the present disclosure. When implemented on a general-purpose processor, the program code combines with the processor to provide a unique apparatus that operates to invoke the functionality described herein.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed:

1. A system comprising:
a general purpose computer having software configured to operate the general purpose computer as a Common Public Radio Interface (CPRI) switch having a control plane and a forwarding plane;
a plurality of eNodeBs each having a remote radio unit (RRU) and a baseband unit (BBU) wherein a plurality of RRUs are connected to the CPRI switch using CPRI protocol;
a plurality of baseband units (BBUs) connected to the CPRI switch using CPRI protocol;
wherein the control plane of the CPRI switch is configured to create forwarding tables between a first one of the plurality of BBUs to a first one of the plurality of RRUs and the forwarding plane of the CPRI switch is configured to route data in accordance with the forwarding tables; and
a software defined network (SDN) controller in communication with the CPRI switch, wherein the SDN controller is configured to execute an algorithm to generate the forwarding tables upon the detection of an event.

2. The system of claim 1 wherein the SDN controller associated with the CPRI switch is configured to detect an event relating to the first one of the plurality of BBUs and in response to detecting the event, the SDN controller is further configured to dynamically re-configure forwarding tables to connect a second one of the plurality of BBUs to the first one of the plurality of RRUs.

3. The system of claim 2 wherein the event is an external event.

4. The system of claim 3 wherein the external event is one of a new site build, a cell site split, and an optimization of a cell site.

5. The system of claim 1 wherein the CPRI switch is further configured to connect the first one of the plurality of BBUs to a second one of the plurality of RRUs when the first one of the plurality of RRUs is unavailable.

6. A method, comprising;
connecting a plurality of baseband units (BBUs) to a plurality of remote radio units (RRUs) through a general purpose computer having software configured to operate as a common public radio interface (CPRI) switch, wherein a control plane and a forwarding plane are separated in the CPRI switch and wherein a software defined network (SDN) controller is in communication with the CPRI switch;

generating, by the control plane, forwarding tables to map BBUs to RRUs;

detecting an event; and updating, by the SDN controller, the forwarding tables responsive to the detecting step.

7. The method of claim 6 wherein the event is a fault.

8. The method of claim 6 wherein the event is an external event.

9. The method of claim 8 wherein the external event is one of a new site build, a cell site split, and an optimization of a cell site.

10. An apparatus comprising:

a general purpose computer having software configured to operate as a common public radio interface ("CPRI") switch wherein the CPRI switch has a control plane and a forwarding plane and is in communication with a software defined network (SDN) controller;

an input/output system for communicatively coupling baseband units (BBUs) to Remote Radio Units (RRUs) through the CPRI switch;

a processor communicatively coupled to the input/output system; and memory storing instructions that cause the processor to effectuate operations, the operations comprising:

generating, by the control plane, forwarding tables to map BBUs to RRUs;

detecting an event by the SDN controller; and updating, by the CPRI switch in response to a command from the SDN controller, the forwarding tables responsive to the detecting step.

11. The apparatus of claim 10 wherein the event is a fault.

12. The apparatus of claim 10 wherein the event is an external event.

13. The apparatus of claim 12 wherein the external event is one of a new site build, a cell site split, and an optimization of a cell site.

* * * * *